United States Patent [19]

Gunday et al.

[11] Patent Number: 5,419,506
[45] Date of Patent: May 30, 1995

[54] CINE-VIDEO FILM TRANSPORT APPARATUS

[75] Inventors: Erhan H. Gunday, New York, N.Y.; Michael Doliton, Maywood; Paul Foung, Dumont, both of N.J.; John R. Lee, New York, N.Y.; Brian Kolaci, Hawthorne, N.J.; Susumu Murakami, Valley Cottage; Erwin P. Ishmael, Monroe, both of N.Y.

[73] Assignee: Sony Electronics, Inc., Park Ridge, N.J.

[21] Appl. No.: 730,539

[22] Filed: Jul. 16, 1991

[51] Int. Cl.⁶ .............................................. G11B 23/04
[52] U.S. Cl. ................................. 242/336; 242/334.6; 242/357; 242/417.3
[58] Field of Search ............... 242/189, 190, 191, 179, 242/336, 334, 334.2, 334.6, 357, 419.1, 417.3; 358/214, 215; 360/137

[56] References Cited

U.S. PATENT DOCUMENTS

| | | | |
|---|---|---|---|
| 3,117,183 | 1/1964 | Mullin | 358/214 |
| 3,405,857 | 10/1968 | Albrecht | 242/190 |
| 3,454,714 | 7/1969 | Henrikson et al. | 358/215 |
| 3,666,204 | 5/1972 | Gysling | 242/189 |
| 3,672,600 | 6/1972 | Carlson et al. | 242/190 |
| 3,718,289 | 2/1973 | Alaimo | 242/190 |
| 3,769,457 | 10/1973 | Valenta, Jr. et al. | 358/214 |
| 3,825,675 | 7/1974 | Bradford et al. | 358/214 |
| 3,856,990 | 12/1974 | Favreau et al. | 358/214 |
| 4,281,351 | 7/1981 | Poetsch et al. | 358/214 |
| 4,319,280 | 3/1982 | Roos et al. | 358/214 |
| 4,356,514 | 10/1982 | Armstrong et al. | 358/214 |
| 4,597,547 | 7/1986 | Tarpley et al. | 242/191 |
| 4,696,440 | 9/1987 | Harigaya et al. | 242/191 |
| 4,739,948 | 4/1988 | Rodal et al. | 242/190 |

FOREIGN PATENT DOCUMENTS 2658945 7/1978 Germany .............................. 358/215

Primary Examiner—Daniel P. Stodola
Assistant Examiner—John Q. Nguyen
Attorney, Agent, or Firm—William S. Frommer; Alvin Sinderbrand

[57] ABSTRACT

Film transport apparatus for a cine-video system in which video signals are produced from film that is driven between supply and take-up reels. The film, which may be wound in A or B configuration on each reel, is threaded automatically about a film drive mechanism which transports the film from the supply reel, through a film gate to the take-up reel. Tensioning apparatus imparts tension to the film at the entry and exit of the film gate which, during the threading operation, causes the respective reels to rotate before film actually is transported therebetween. The direction in which each reel rotates to unwind film therefrom when tension is imparted serves to identify whether the film is wound in A or B configuration. Advantageously, a programmable processor controls the film transport speed in response to a user-actuated knob; and this same processor serves to detect when the film approaches its end on the supply or take-up reel.

11 Claims, 8 Drawing Sheets

CINE-VIDEO FILM TRANSPORT APPARATUS

BACKGROUND OF THE INVENTION

This invention relates to film transport apparatus and, more particularly, to such apparatus which finds ready application in a cine-video system and which is software controlled for ease of use.

Film transports having general application are well known to those of ordinary skill in the art, particularly in the field of cinematography or the like. The basics of a typical film transport include a film gate, through which film is transported, which defines a location at which photographic images on the film are projected, supply and take-up reels from which the film is unwound and to which the transported film is wound, respectively, and a means for driving the film which, typically, comprises a sprocket wheel having teeth to engage the usual apertures, or perforations, in the film to transport it through the film gate. This typical film transport is used in cine-video converters, whereby the photographic images on the film are converted to video signals for display on a typical video monitor. One application of cine-video converters is in the medical field and, particularly, in angiography such as in cardiac catherization laboratories for producing high resolution displays on a standard video monitor from 35 mm angiographic film.

While various video-related subsystems have been developed for the aforementioned cine-video converters, one major drawback in the acceptance of such converters resides in the film transport apparatus used therewith. The usual requirement of precise positioning of the photographic film at the imaging location, or film gate, has resulted in a complicated transport path between the supply and take-up reels, requiring careful threading of the film, which frequently becomes frustrating for one without sufficient experience and laborious even for a highly trained technician. Typical film transport apparatus have been known to damage or even destroy the film being transported.

Another difficulty associated with film transport apparatus used in prior cine-video systems relates to limited transport speed control. In many film transports, only a few predetermined transport speeds may be selected, such as a transport speed of 15 or 30 film frames per second. However, a user often wishes to transport the film at a variable speed, either to reach a desired frame rapidly or to observe movement of the photographed features displayed on the video monitor. But, since most film transports exhibit simple mechanical controls, selection from a desirably large range of speed variance often is not possible. Further, even in those film transports having a variable film transport speed selected by, for example, a rotary knob, angular movement of the knob results in a corresponding transport speed which, normally, exhibits a fixed proportionality between transport speed and knob rotation, thus requiring an undesirably large knob rotation to effect high speeds. Alternatively, if the rotary knob exhibits a wide dynamic range so that, for example, high speeds are attained by limited angular movement, it is difficult for all but specially skilled technicians to provide fine speed control at slow transport speeds with this control knob.

A still further drawback found in conventional film transport apparatus relates to the manner in which the supply and take-up reels are installed on the apparatus. Typically, film may be wound in what is commonly referred to as A or B configurations, wherein a supply reel unwinds in the counterclockwise direction when film has been wound thereon in A configuration; and the take-up reel rotates in the counterclockwise direction while film is being wound thereon. Film wound on the supply reel in B configuration results in clockwise rotation when such film is unwound while film being wound on the take-up reel in B configuration results in clockwise rotation thereof. Heretofore, for proper operation of the film transport apparatus such that film unwinds from the supply reel and winds onto the take-up reel easily and without spillage, it has been necessary for the user to know beforehand whether film is wound in the A or B configuration and install the reels properly. Often, a determination of the film winding configuration results in wasteful time and may prove to be frustrating.

Yet another disadvantage associated with conventional film transport apparatus used in cine-video systems is the general inability of such apparatus to stop before the supply or take-up reel reaches its end. For example, during forward movement of the film, if the user does not monitor the size of the supply reel closely, film may "fly off" that reel, thus requiring careful and often frustrating re-threading thereof. Likewise, as film is rewound from the take-up reel onto the supply reel, if the size of the take-up reel is not monitored closely, film may "fly off" and thus require re-threading before images on that film subsequently may be viewed.

Since a preferred application of a cine-video system is in the medical field, it is expected that highly qualified physicians will operate such systems; but they properly are more concerned with the information being displayed rather than the technical features and drawbacks of the system itself. Such physicians often lack the skill of a trained mechanical technician and should not have to be overly concerned with the difficulties of threading and operating the film transport apparatus.

OBJECTS OF THE INVENTION

Therefore, it is an object of the present invention to provide an improved film transport apparatus for use in a cine-video system which overcomes the aforenoted drawbacks and disadvantages associated with prior art film transport apparatus.

Another object of this invention is to provide improved apparatus which permits automatic detection of whether film is wound in A or B configuration on supply and take-up reels.

Another object of this invention is to provide apparatus which exhibits automatic film threading and loading, thus obviating the need for a skilled technician to prepare the cine-video system for operation.

A further object of this invention is to provide variable film speed control which permits a broad range of transport speeds to be obtained by manual operation of a speed selector, preferably a rotary knob.

A still further object of this invention is to provide film transport apparatus in which a programmable processor is used to control transport speed.

Still another object of this invention is to provide film transport apparatus which senses when film transported from one reel to another approaches its end.

An additional object is to provide film transport apparatus of the aforementioned type which obviates the drawback of film "flying off" the supply or take-up reel.

Yet a further object of this invention is to provide improved film transport apparatus for use in a cine-video system in which the film is subjected to proper tension control, preferably under the supervision of a programmed processor, such that substantially constant tension is imparted to the film as it is transported through a film gate.

Various other objects, advantages and features of the present invention will become readily apparent from the ensuing detailed description, and the novel features will be particularly pointed out in the appended claims.

SUMMARY OF THE INVENTION

In accordance with this invention, film transport apparatus is provided in a cine-video system, wherein film which extends between supply and take-up reels is inserted into a film gate through which the film is transported to derive video signals. The film is easily disposed through the film gate and is threaded automatically about a film drive arrangement, such as a sprocket wheel. When the film gate is closed, a tensioning assembly is activated to impart tension to the film at the entry and exit of the film gate. As tension is applied, film wound on the supply reel tends to unwind therefrom and, similarly, film that is partially wound on the take-up reel likewise tends to unwind therefrom. The directions in which the supply and take-up reels rotate during this partial unwinding operation is sensed and used to identify whether the film is wound in A or B configuration on such reels.

As one aspect of this invention, the supply and take-up reels are motor driven and, depending upon whether film is wound thereon in A or B configuration, the respective reels are driven in the proper direction, consonant with such configuration, to transport film between the supply and take-up reels.

As another aspect of this invention, tension signals representing the tension imparted to the film at the entry and exit of the film gate are supplied to a controller, such as a programmed processor, which, in turn, drives the supply and takeup reel motors in a direction and at a speed to maintain a predetermined tension on the film. As a feature of this aspect, the tensioning assembly preferably is-comprised of dancer arms. The position of each dancer arm is indicative of the amount of tension imparted thereby to the film.

As a further aspect of this invention, the speed with which the film is transported between the supply and take-up reels is determined by a manually operable selector. Preferably, this selector comprises a rotary knob; and the direction and speed of film movement is a function of the direction and amount of angular displacement of the knob. As a feature of this aspect, the knob operates with a programmed processor having settable proportionality constants such that the speed of film movement is a function of the angular displacement of the rotary knob and the particular proportionality constant that has been set. Thus, a given angular displacement of the knob produces different film speeds, depending upon the particular proportionality constant that is selected by the user.

As another feature of this aspect, the rotary knob includes a solenoid which is selectively energized by the programmed processor to emulate a detent to angular movement. The relative location of the detent as the knob is rotated may be selected easily and changed readily by reprogramming the processor.

As yet another aspect of this invention, the diameter of film wound on the supply or take-up reels is determined and used by the programmable processor to control the film transport speed, such as during forward film movement, and thereby halt further film movement before the film "flies off" its reel.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
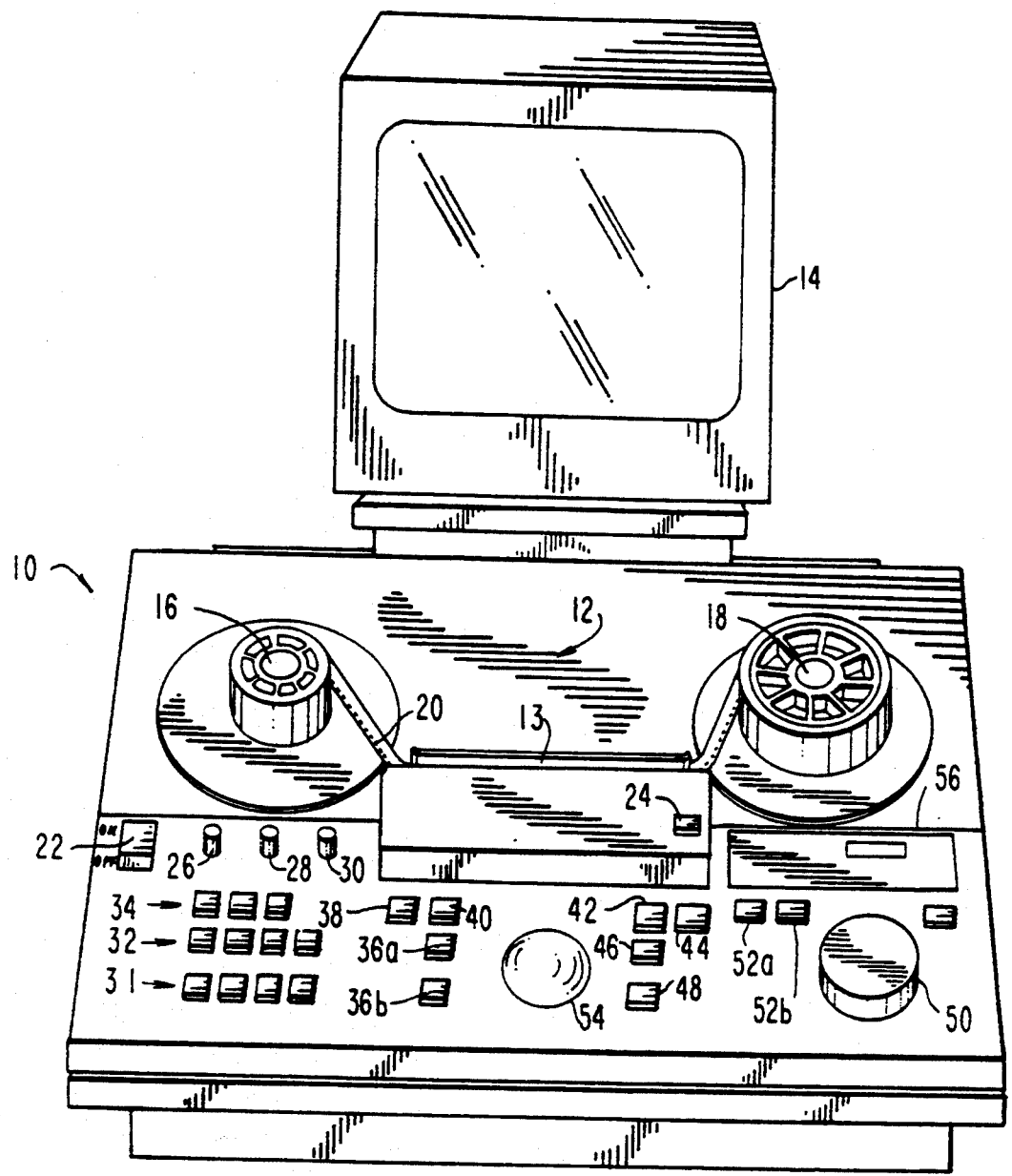
FIG. 1 is a perspective view of a cine-video system in which the film transport apparatus of the present invention finds ready application.

Referring now to the drawings, wherein like reference numerals are used throughout, and in particular to FIG. 1, there is illustrated a cine-video system in which the present invention finds ready application. The purpose of this cine-video system is to generate video signals representing photographic images previously recorded on conventional photographic medium, such as on conventional 35 mm photographic film. The illustrated cine-video system is particularly useful in the environment of a cardiac cath lab; and the photographic film images typically represent X-ray images of the cardiac system. It will be appreciated that the information represented by such X-ray or photographic images is not critical to the present invention.

The illustrated cine-video system is comprised of a console 10 which houses a film transport assembly 12, a video imaging subsystem and a video monitor 14. The film transport assembly is adapted to move film 20 bidirectionally between a supply reel 16 and a take-up reel 18 through a film gate which defines an imaging station at which is positioned an optical image projector and a video image pickup device, such as a CCD camera or the like. As described more particularly in copending application Serial No. (Attorney's Docket 390103-2378), as each photographic film frame is transported through the film gate, an optical image thereof is projected to the image pickup camera which generates video signals corresponding thereto; and these video signals are processed, stored and enhanced and then displayed on monitor 14. If desired, console 10 may be provided with a viewing station, such as a binocular viewer, to which an optical image is projected by a mirror that normally is retracted so as not to intercept the optical path to the image pickup camera. Hence, confirmation of the video image with the optical image may be made, if desired.

The video monitor may comprise a conventional NTSC monitor, a multi-scan monitor or a high resolution monitor operable to display a video image comprised of twice the conventional number of horizontal raster lines which constitute a standard video image. The video image displayed on the monitor may appear as a moving image if film 20 moves between the supply and take-up reels; or the image may be displayed as a still image if film 20 is stationary. The manner in which video signals are generated to produce a video image forms no part of the present invention per se; but is the subject of the aforementioned copending application. As described therein, such video signals preferably are digital video signals which may be recorded directly on a conventional digital video recorder, such as the so-called D-2 digital recorder.

Film transport assembly 12 is described in greater detail below. As will be explained, supply reel 16 and take-up reel 18 are driven by supply and take-up motors, respectively, under the control of a suitably programmed microprocessor or other signal processing device known to those of ordinary skill in the art. A film gate exhibits active and inactive states, the former serving to clamp film 20 for stable positioning at the optical imaging station such that an optical image of a film frame is projected to the image pickup camera.

Typically, the film used with the illustrated cine-video system is wound upon a supply reel of conventional diameter, for example, a diameter of 2 inches or 3 inches and, similarly, take-up reel 18 may be a 2-inch or 3-inch reel. As will be described, threading of film 20 through the film drive mechanism (not shown in FIG. 1) is generally automatic. When the film gate (and, thus, the film transport assembly) is in its inactive state, the film gate is open and a user simply may slide the film through a slot 13 of the film gate, with the free end of the film then being wound easily about take-up reel 18. For example, the take-up reel may be rotated three or four times to insure a firm winding of the free end of film 20 thereon. Then, when the film gate is closed, as by operation of a film gate switch 24, the components included in film transport assembly 12 engage the film and are thus enabled to transport film either in the forward direction from supply reel 16 to take-up reel 18 or in the reverse direction from take-up reel 18 to supply reel 16. The major components included in the film transport assembly are illustrated schematically in FIG. 2.

Film conventionally is wound on a supply reel in either the so-called A configuration or B configuration. Likewise, when transported to the take-up reel, film may be wound thereon in A or B configuration. Film wound on the supply reel in A configuration results in counterclockwise rotation of the supply reel as the film is paid out. Conversely, film wound on the supply reel in B configuration results in clockwise rotation of the supply reel when the film is paid out therefrom. Similarly, when film is being wound upon the take-up reel in the A configuration, the take-up reel rotates in the counterclockwise direction. The take-up reel rotates in the clockwise direction when film is being wound thereon in the B configuration. Typically, film is wound on the supply and take-up reels in the same configuration, that is, both windings are A configuration or both are B configuration. It is possible, however, that film may be wound on one reel in A configuration and on the other in B configuration. As will be described below, the film transport assembly of the present invention automatically senses the particular configuration in which the film is wound on the supply and take-up reels and controls the supply and take-up motors to drive these reels in a rotary direction compatible with such configuration.

Before describing film transport assembly 12 in greater detail, brief reference is made to the user-selectable switches provided on console 10 for operating the cine-video system. An ON/OFF switch 22 selectively supplies energizing power to film transport assembly 12, to the image projector, to the video pickup device and to the signal processing circuitry included in the cine-video system. A focus adjust control 26 is manually operable to adjust the focusing of the image pickup camera. For example, the lens assembly included in the camera may be adjusted to provide such focusing, resulting in a sharp video image. Alternatively, a separate focusing lens may be provided in the optical image projector to achieve such focusing. As yet another alternative, the position of the camera itself may be adjustable, relative to film 20, to achieve focusing adjustments.

A brightness adjustment control 28 is operable to adjust the brightness of the video image displayed on, for example, monitor 14. It will be appreciated that this control cooperates with the monitor and does not affect the video signals produced by the image pickup device. An iris adjustment 30 is operable to adjust the contrast of the image displayed on monitor 14. Preferably, an aperture opening in the optical image projector is controlled to achieve such contrast adjustments. Alternatively, operation of adjustment knob 30 produces an adjustment on monitor 14.

A set of enhancement switches 31 is provided to enable the user to select various enhancements of the video image displayed on monitor 14. For example, the relative polarity of the video image, which typically is a monochrome image, may be inverted such that a positive image is displayed as a negative image. In addition, different gamma corrections may be attained by operating selected ones of enhancement switches 31. As another enhancement, a range of grey levels may be selected by operating yet another one of the enhancement switches, this range being adjustable by operation of a track ball 54 (described in the aforementioned copending application) such that video signals whose levels are outside this range simply are suppressed. The resultant video image thus permits greater discrimination by the user of selected portions of the displayed video picture.

Frame image memory selector switches 32 enable the user to display any one of four stored video pictures. In one implementation of the cine-video system, four (or more) frame store memories are provided, each adapted to store a respective frame of video signals derived from a corresponding film frame. The actuation of a selected one of the frame image memory select switches reads out the video signals stored in the corresponding frame store memory for display on monitor 14. Memory control switches 34 are selectively operable in conjunction with frame image memory select switches 32 to write into a frame store memory selected by a switch 32 those video signals corresponding to a video image then displayed on monitor 14. The memory control switches also are operable to clear, or erase, the contents of the frame store memory selected by a switch 32. Still further, another one of memory control switches 34 is operable to display simultaneously the video images corresponding to the video signals stored in all of the frame store memories.

In another implementation, suitable memory capacity is provided to store the identities of a number (e.g. 4) of film frames and the particular pan and zoom settings (described below) that were established when those frames were displayed on monitor 14. The stored identity and settings may be retrieved and used to access the film frame for conversion to a video image.

Cursor select switches 36a and 36b are operable to display respective cursors as overlays on the video image displayed by monitor 14. The position of these cursors is adjustable by manual operation of track ball 54. For example, if cursor select switch 36a is actuated, a first cursor corresponding thereto is displayed and the position of this first cursor may be adjusted vertically by "y—y" movement of the track ball and horizontally by "x—x" movement of the same track ball. The actuation of cursor select switch 36b displays a second cursor whose position likewise may be adjusted by operation of track ball 54. When the user positions these two cursors at desired locations on the displayed video picture, the distance therebetween may be calibrated by actuating calibrate switch 38. Once this calibrate switch is operated, a numerical display which, initially, is arbitrary, is displayed on alphanumeric display 56 for the purpose of indicating the distance, or separation of the two cursors. By operating track ball 54, the displayed numerical value may be increased or decreased to a desired, known amount. For example, if the two cursors are disposed on diametrically opposite sides of a catheter displayed on monitor 14, since the diameter of the catheter is known, track ball 54 may be operated until alphanumeric display 56 displays this known diameter. The actuation of calibrate switch 38 once again results in the storage of this value as a reference. Thereafter, the two cursors may be positioned at any desired locations by operating cursor select switches 36a and 36b together with track ball 54; and the distance therebetween will be measured and displayed. Thus, the size of an object displayed on monitor 14 and derived from a film frame may be measured easily simply by placing the two cursors at desired locations on the image of that object. It will be appreciated that the user thus may obtain quick and accurate indications of, for example, the percentage of stenosis of a lumen that is displayed on monitor 14.

A pan switch 42 is provided to permit the user to "move" the image displayed on monitor 14 in the "x—x" or "y—y" direction. Because of the arrangement of the film frames on film 20 (they are recorded "sideways"), for "y—y" movement film transport assembly 12 is selectively energized to advance or retard the film by small, incremental amounts determined by operation of track ball 54. For "x—x" movement, the video image pickup device is moved in response to the track ball. This pan feature is particularly useful when the video image displayed on monitor 14 is less than a full film frame and those portions of the film frame which are not displayed are intended to be viewed. The pan feature also serves to position a desired portion of the film frame in the center or other desirable location of the screen of monitor 14. Typically, the pan feature is used in conjunction with the zoom feature, now described.

A zoom switch 44 is selectively operable to increase or decrease the magnification of the photographic image that is optically projected to the video image pickup device. For example, a conventional zoom lens assembly may be used with the image pickup device or with the optical image projector to provide such magnification. As the video camera "zooms in" on a portion of the photographic image, pan switch 42 may be actuated to permit the video camera to "pan" across the film frame. It will be appreciated that the user may operate track ball 54 for increasing or decreasing the magnification of the image picked up by the video camera.

A reset switch 46 is operable to cancel, or reset, the pan and zoom functions, respectively, and to clear the settings therefor that may have been stored. A frame setting switch 48, when actuated, locks the then-present zoom position of the camera or projector and also locks the then-present pan position of the film frame to establish reference zoom and pan positions to which the imaging apparatus is reset in the event that reset switch 46 is actuated. In one embodiment, if the frame setting switch is not operated when a new film frame is imaged, the zoom and pan settings that had last been locked are used as the reference settings. In an alternative embodiment, default settings are used when a new film frame is imaged in the event that frame setting switch 48 is not actuated. Such default settings may be, for example, a magnification ratio of 1× and a pan setting which substantially centers the film frame in the film gate. Preferably, the zoom and pan settings are represented by digital signals corresponding to the positioning of the video camera and film frame, respectively, and supplied to a controlling processor whereat they are stored for subsequent reuse.

A speed control knob 50 is manually operated to establish direction and speed of movement of film 20 by film transport assembly 12. In the preferred embodiment, the speed control knob is used in conjunction with a programmable processor such that a given angular movement of the speed control knob may result in different speed selections, depending upon the programming, or settings, of the processor. For example, an angular rotation of 75° may result in a film transport speed on the order of about 10 frames per second for one setting, 20 frames per second for another setting, 30 frames per second for yet another setting, and so on. Such settings may be selected as desired by suitable programming of the processor. Still further, it is preferred that speed control knob 50 be provided with detents at different angular positions thereof. In one embodiment, such detents are produced by a solenoid which is energized by the aforementioned programmable processor when speed control knob 50 is rotated by a predetermined amount. The angular movement upon which a detent effect occurs may be varied simply by changing the program of the processor.

Frame advance switches 52a and 52b are operable to drive film transport assembly 12 such that film 20 is transported in the forward or reverse direction by an amount equal to one film frame. For example, the actuation of switch 52a drives film 20 in the reverse direction for a distance equal to one film frame; and the actuation of switch 52b drives the film in the forward direction.

Alphanumeric display 56 provides suitable messages to the user depending upon his operation of console 10. For example, when film gate switch 24 is actuated, display 56 provides suitable messages, such as "film gate closing", "film gate closed" and the number of the film frame then positioned in the film gate. When one of the frame image memory select switches 32 is actuated, display 56 indicates the frame store memory that has been actuated to store or read video signals. The actuation of cursor select switches 36 results in an indication of the displayed cursor which may be positioned. For example, alphanumeric display 56 may display "cursor 1" or "cursor 2" depending upon which of the cursor select switches is actuated. Similarly, a suitable message is displayed when calibrate switch 38 is actuated. For example, an indication of the "calibrate" function is provided as well as a numerical value representing the distance between the displayed cursors. As mentioned above, this numerical value is increased or decreased as track ball 54 is operated. Similarly, when measure switch 40 is actuated, display 56 indicates a numerical percentage of distance between the displayed cursors.

It will be appreciated that other representative messages are indicated by alphanumeric display 56 and, in the interest of brevity, further discussion of such messages is not provided.

Figure 2:
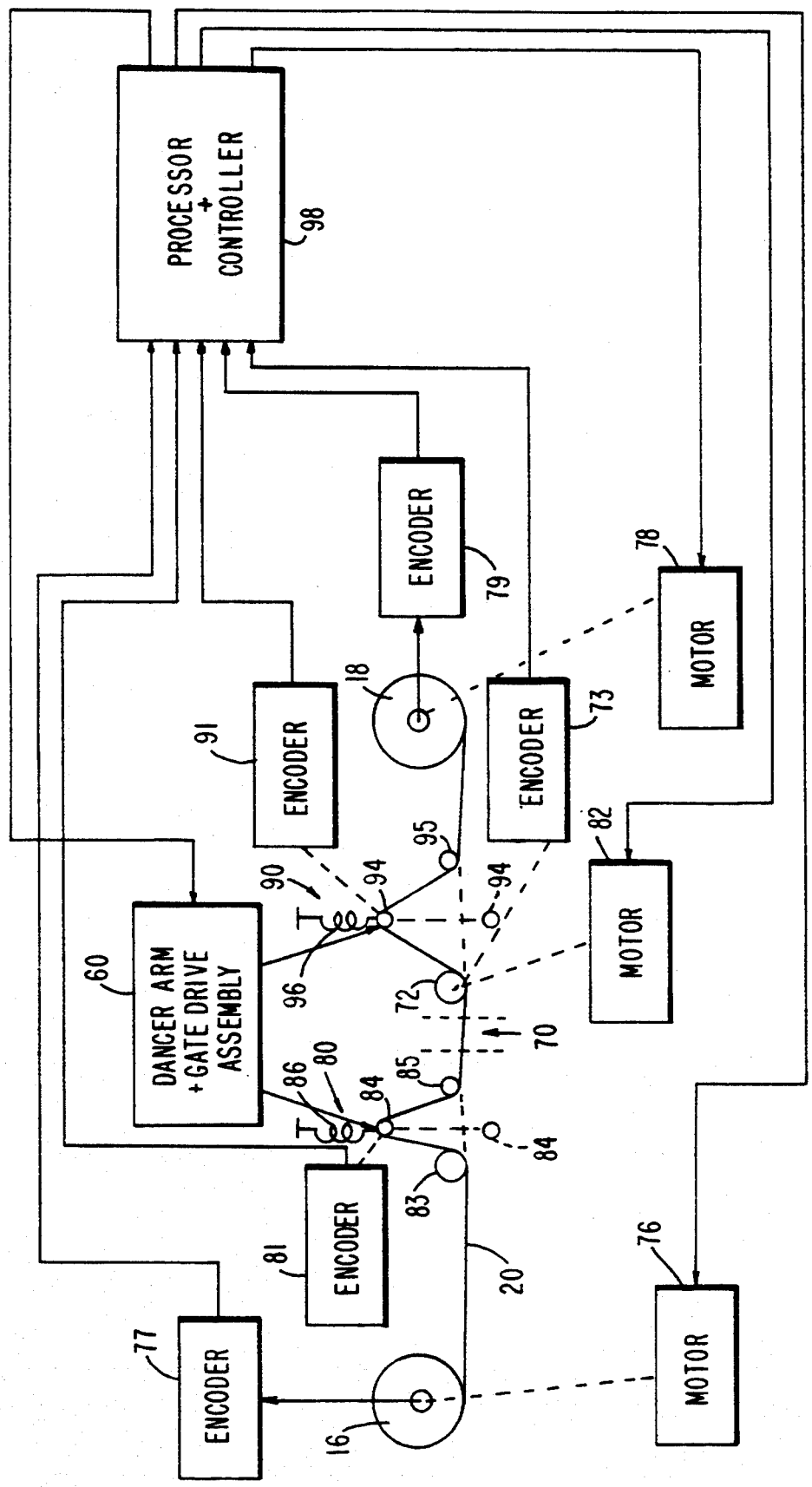
FIG. 2 is a schematic representation of the film transport apparatus of the present invention.

Turning now to FIG. 2, there is illustrated a schematic representation of film transport assembly 12. The film transport assembly is comprised of a sprocket wheel 72, dancer arms 80 and 90, a dancer arm drive assembly 60 and encoders and motors which are used to transport film 20 through an imaging station at a film gate location 70 between supply reel 16 and take-up reel 18. Sprocket wheel 72 is coupled to a sprocket motor 82 which bidirectionally drives the sprocket wheel to move film 20 in the forward or reverse direction, respectively. In the preferred embodiment, film 20 comprises conventional 35 mm film having sprocket holes, or apertures, exhibiting precise spacing along its longitudinal edges. Alternatively, the film may be driven by a suitable capstan/pinch roller arrangement wherein sprocket wheel 72 is replaced by a capstan.

The sprocket wheel is coupled to an encoder 73 which, for example, generates a number of pulses for each rotation of the sprocket wheel. As one example, encoder 73 generates 250 pulses when sprocket wheel 72 is rotated so as to transport film 20 by a distance equal to one film frame (it will be appreciated that film frames are spaced uniformly along film 20). Alternatively, encoder 73 simply may provide a count representing the distance moved by film 20. In any event, the position of, for example, the center of a film frame relative to the center of film gate location 70 is represented by encoder 73. Preferably, the center-to-center movement of adjacent film frames results in 250 pulses produced (or counted) by encoder 73.

Dancer arm 80 is referred to as a supply dancer arm and dancer arm 90 is referred to as a take-up dancer arm. Each dancer arm includes an idler, such as idler 84 or 94, about which film 20 moves, and a spring, such as spring 86 or 96, whose spring tension exerts an upward force (as viewed in FIG. 2) on idler 84 or 94 so as to impart tension to the film deployed about the idler. It will be appreciated that idler 84 or 94 may be mounted at one end of a strut or other rigid member and spring 86 or 96 may be coupled to its other end. Dancer arm drive assembly 60, shown in greater detail in FIG. 3, serves to activate the dancer arms from their quiescent, or inactive states represented by idlers 84 and 94 in broken lines, to their active states shown in solid lines. It is seen that, when supply dancer arm 80 is in its quiescent state, idler 84 is disposed below rollers 83 and 85 (whose positions are fixed) to permit film 20 to be placed easily in the space between this idler and the rollers. Likewise, when take-up dancer arm 90 is in its quiescent state, idler 94 is disposed below sprocket wheel 72 and roller 95 to permit film 20 to be placed therebetween. Thus, a user may extend a length of film 20 from supply reel 16 to take-up reel 18 along the path represented by the broken lines shown in FIG. 2. In this manner, the film extends easily through film gate location 70. Upon energization, as when film gate switch 24 (FIG. 1) is actuated, dancer arm drive assembly 60 drives the supply and take-up dancer arms to their active states, as shown in solid lines in FIG. 2, thus automatically threading film 20 from supply reel 16 about roller 83, about idler 84, about roller 85, about sprocket wheel 72, about idler 94 and about roller 95 to take-up reel 18 and establishing film loops deployed about idlers 84 and 94, as shown. The actuation of the dancer arm drive assembly also closes the film gate to clamp film 20 accurately and stably at the imaging station even while the film is transported between the supply and take-up reels.

In operation, a user typically positions supply reel 16 on a drive spindle and then pays out a length of film from the supply reel to take-up reel 18 and wraps three or four windings of the film about the take-up reel. From FIG. 1, it will be appreciated that film 20 is inserted into slot 13 and thus follows the path represented in FIG. 2 by broken lines. When film gate switch 24 is actuated, dancer arm drive assembly 60 is controlled by a processor and controller 98 that senses the actuation of the film gate switch and drives dancer arms 80 and 90 in the upward direction (as viewed in FIG. 2) to impart tension to film 20 at both the entry and exit of the film gate. The film 20 thus extends from supply reel 16 to take-up reel 18 via the tortuous path represented by the solid lines of FIG. 2.

The actuation of the film gate switch also closes the film gate to clamp the film at the imaging station of film gate location 70. Thereafter, processor 98 controls sprocket motor 82 to drive sprocket wheel 72, thereby causing film 20 to exert a force on dancer arm 80 and to unwind the supply reel to pay out a portion of the film therefrom. Encoder 77, which may be an optical encoder, is coupled to the supply reel or, alternatively, to a supply reel platform or to the supply reel drive spindle, and senses the direction in which the supply reel rotates as tape is paid out therefrom. An indication of this rotation direction is coupled to processor 98 to detect if the supply reel now rotates in the clockwise or counterclockwise direction. From FIG. 4, it is appreciated that if the supply reel rotates in the counterclockwise direction, tape 20 is wound thereon in A configuration.

Similarly, processor 98 controls sprocket motor 82 to drive sprocket wheel 72 in a direction such that film 20 exerts a force on dancer arm 90 and unwinds a length of film from take-up reel 18. Encoder 79, which may be similar to encoder 77, is coupled to the take-up reel and detects the angular rotation thereof. Signals representing such angular rotation are supplied to the processor to determine whether take-up reel 18 rotates in the clockwise or counterclockwise direction. If the take-up reel rotates in the clockwise direction while film is unwound therefrom, it is determined that film is wound thereon in A configuration.

Figure 6:
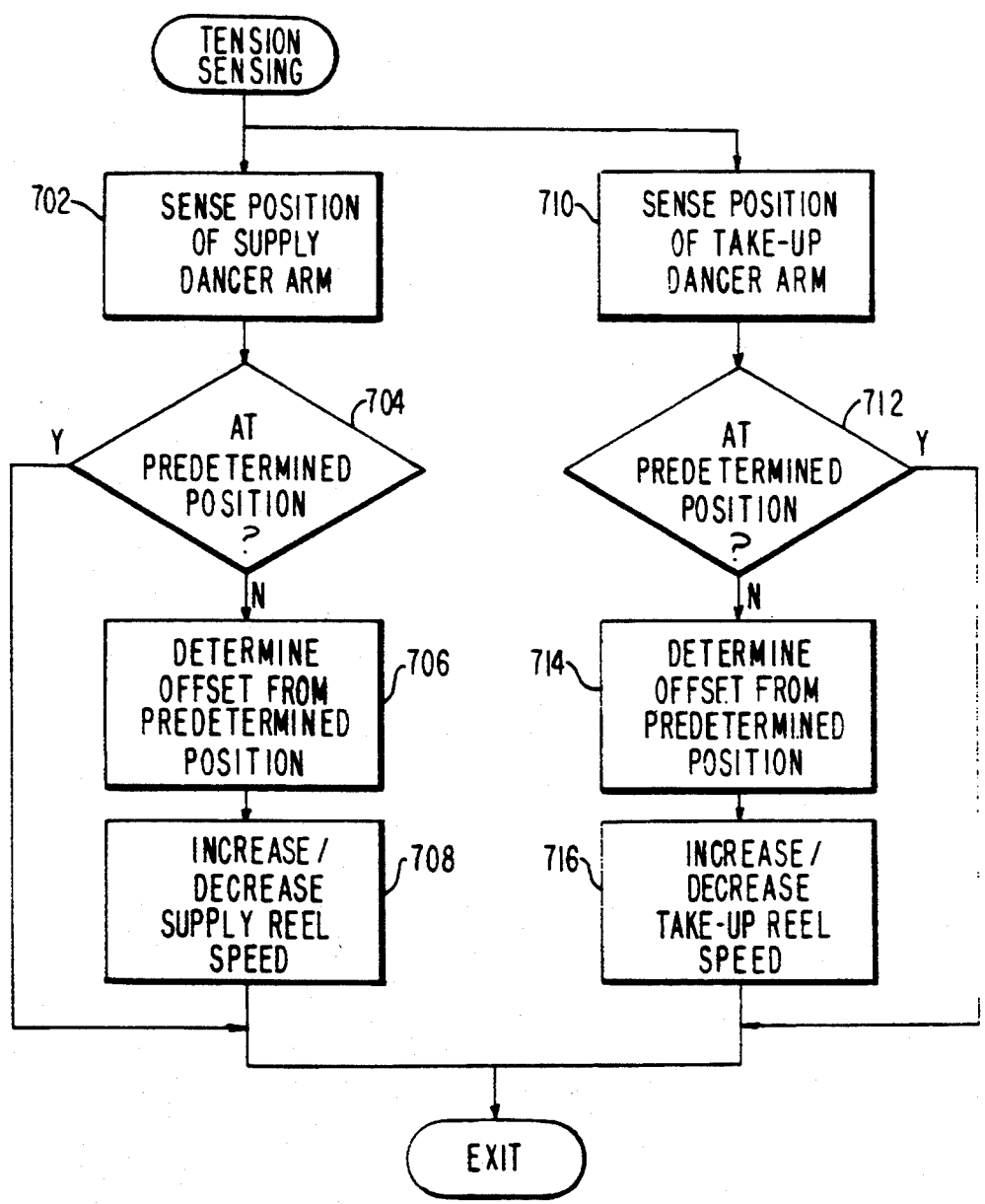
FIG. 6 is a flow chart illustrating the manner in which tension is sensed and controlled in accordance with the present invention.

Thus, during this film loading or threading operation, the rotation of the supply and take-up reels is detected and the configuration in which the film is wound on these reels is identified by processor 98 as a function of the sensed rotational direction thereof in a manner described in greater detail with respect to FIG. 6. It is appreciated that, once the film winding configuration is identified, the supply and take-up reels are driven in a direction compatible therewith to advance film from one reel to the other. That is, when film is wound in A configuration, processor 98 controls supply motor 76 and take-up motor 78 to drive supply reels 16 and 18, respectively, in the counterclockwise direction while sprocket motor 82 is controlled to drive sprocket wheel 72 to transport film 20 in the forward direction. If film is wound in B configuration on both reels, the processor controls supply-motor 76 and take-up motor 78 to drive supply reel 16 and take-up reel 18, respectively, in the clockwise direction for forward movement of the film.

To effect forward movement of film 20, speed control knob 50 (FIG. 1) is rotated in the clockwise direction to energize motor 82. It will be appreciated that the angular movement of the speed control knob is sensed and supplied to the processor which, in turn, produces drive signals that are supplied to sprocket motor 82. The magnitude of such drive signals is dependent upon the angular displacement of knob 50 as well as the aforementioned proportionality setting of the processor. As film is driven in this forward direction, motor 76 drives supply reel 16 in a direction to pay out film therefrom. If the supply reel rotates at a rate that is too slow relative to the rotary speed of sprocket wheel 72, this speed differential tends to reduce the size of the film loop deployed about idler 84, thus imparting a downward force on the idler which overcomes the spring tension force exerted thereon by spring 86. Supply dancer arm 80 is coupled to an encoder 81 which senses the relative position of the dancer arm and, thus, the relative position of idler 84. It is appreciated that the position of idler 84 is an indication of the tension imparted thereby onto film 20. As idler 84 moves in the downward direction, greater tension is imparted thereby on the film. Conversely, as the idler moves in the upward direction, the tension imparted on film 20 is reduced. Thus, the position of the idler (or dancer arm) is indicative of the tension imparted on film 20. Encoder 81 senses the position of the supply dancer arm and produces tension signals for the processor 98 corresponding to such position. As these tension signals increase, as will occur when idler 84 moves in the downward direction, the processor produces drive signals for supply motor 76 to increase the speed thereof and, thus, the angular rotation of supply reel 16. This, in turn, tends to reduce the tension imparted on film 20 by idler 84 and the dancer arm moves in the upward direction. Conversely, if the tension signals produced by encoder 81 indicate a reduction in tension, as will be produced when idler 84 moves in the upward direction, the processor reduces the motor drive signals that are supplied to supply motor 76, thus reducing the rotary speed of supply reel 16 and thereby increasing the tension imparted on film 20. It is seen that the combination of encoder 81 and the processor serve to maintain the tension imparted on film 20 by idler 84 within a predetermined range and, preferably, at a predetermined level.

Encoder 91 is similar to encoder 81 and supplies tension signals to processor 98 as a function of the relative position of idler 94. Thus, this encoder cooperates with the processor to control the speed of take-up motor 78, thereby maintaining the tension imparted on film 20 by idler 94 within a predetermined range and, preferably, at a predetermined magnitude. By maintaining substantially constant tension at the entry and exit of the film gate, sprocket wheel 72 drives film 20 stably and substantially without jitter. Thus, the image pickup device included in the cine-video system produces video signals which, when displayed, result in a stable video image derived from the photographic image of the film frame positioned at film gate location 70.

As film is paid out from supply reel 16, the supply reel is driven by supply motor 79 to rotate at an ever-increasing speed as its diameter decreases. Encoder 77 supplies to processor 98 signals representing the direction and rotary speed of supply reel 16. Similarly, as film continues to be wound upon take-up reel 18, the processor controls take-up motor 78 to drive the take-up reel at an ever-decreasing speed as its diameter increases. Encoder 79 supplies to processor 98 signals representing the rotary direction and speed of the take-up reel. As described below, the processor is programmed to utilize the speed-representing signals supplied thereto by encoders 77 and 79 to calculate the diameter of the outer winding of film then present on supply reel 16 and on take-up reel 18. Since the hub of the supply and take-up reels is of fixed, standard dimension (such as a diameter of 2 inches or 3 inches), and since this hub diameter is known, the diameter of the outer winding of film wound upon the supply or take-up reel thus indicates when the film approaches its end. When the calculated diameter is equal to a predetermined size, processor 98 halts motors 76, 78 and 82 to prevent the film from "flying off" its reel. Thus, when film is transported in the forward direction, the amount of film remaining on supply reel 16 is calculated, and when this amount reaches a predetermined value, the motors are halted. Conversely, when film 20 is transported in the reverse direction, the amount of film wound upon take-up reel 18 is calculated, and when this amount is equal to a predetermined value, the motors are halted. Consequently, the annoyance of re-threading film which has inadvertently flown off its supply or take-up reel is avoided.

It will be appreciated that, although the processor halts motors 76, 78 and 82, these motors are not deenergized. Rather, they remain active to the extent that the desired tension still is imparted to the film at the entry and exit of the film gate by dancer arms 80 and 90.

One embodiment of dancer arm drive assembly 60 now will be described in conjunction with FIG. 3. Dancer arms 80 and 90 are illustrated as assemblies comprised of rods or struts 302 and 312, respectively. Strut 302, which is pivoted at 304 for rotary movement in the direction of arrow C, has one end thereof provided with idler 84 which rides in an arcuate slot 306, thus defining and limiting the angular movement of the strut. An angle encoder (not shown) is coupled to strut 302 to provide a digital signal representing the angular position thereof and, thus, the position of idler 84 within slot 306. It is appreciated that this position representation of strut 302 indicates the vertical position of idler 84 and, thus, the tension imparted on film 20.

Dancer arm assembly 90 is of a similar construction and is comprised of a rod or strut 312 pivotable about a pivot axis 314 and having one end thereof provided with idler 94. This idler rides in an arcuate slot 316 which defines and limits maximum and minimum angular movements of strut 312. An encoder (not shown), which preferably is an angle encoder, is coupled to strut 312 and produces a digital signal representing the angular position of dancer arm assembly 90. This signal thus indicates the vertical position of idler 94 and, thus, the tension imparted thereby on film 20.

Figure 3:
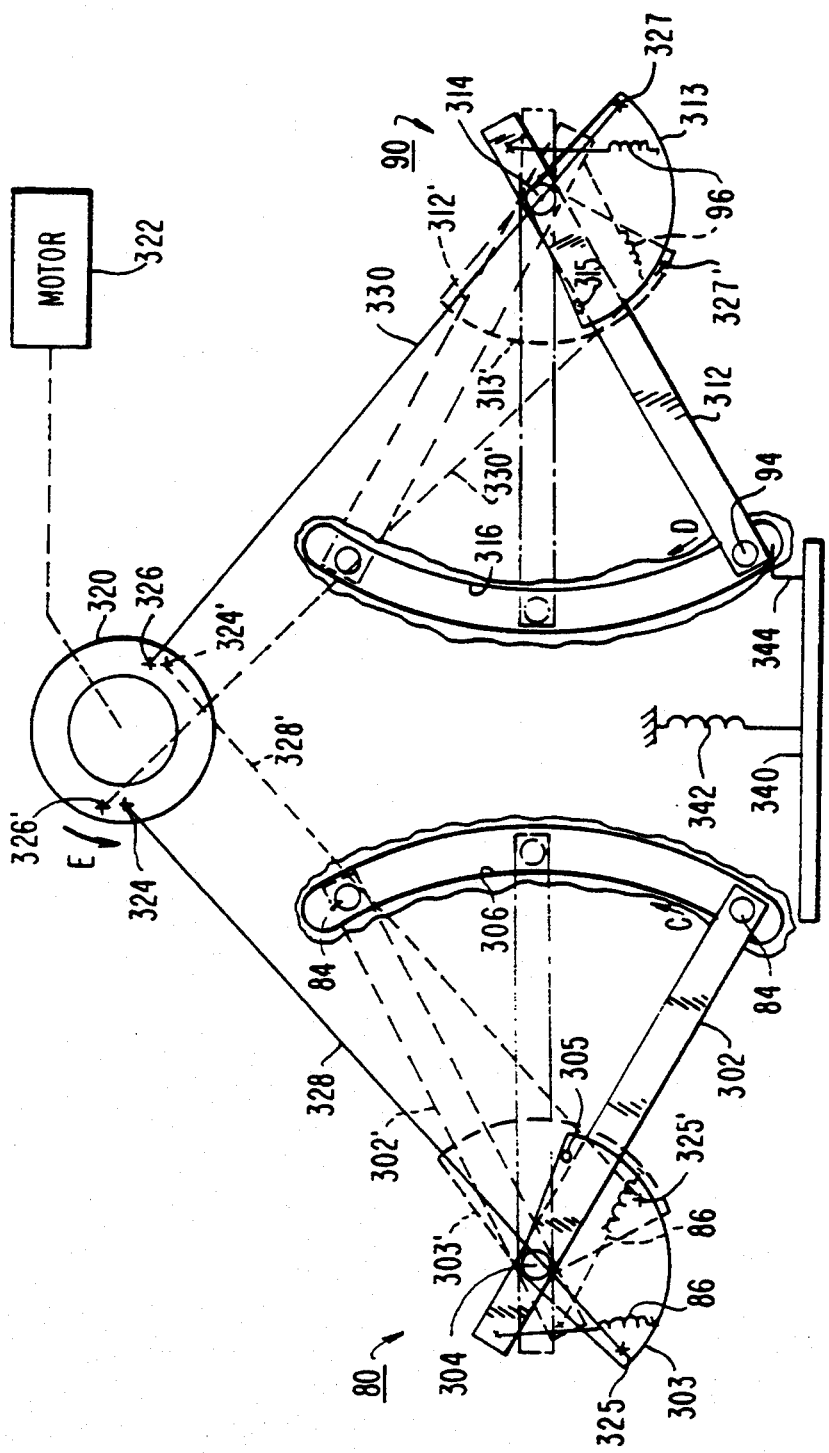
FIG. 3 illustrates the dancer arm mechanism used with the present invention.
Figure 4A:
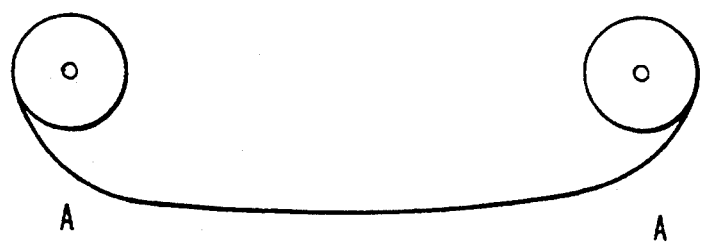
FIGS. 4A-4D schematically illustrate the A and B configurations in which film may be wound on the supply and takeup reels.
Figure 4B:
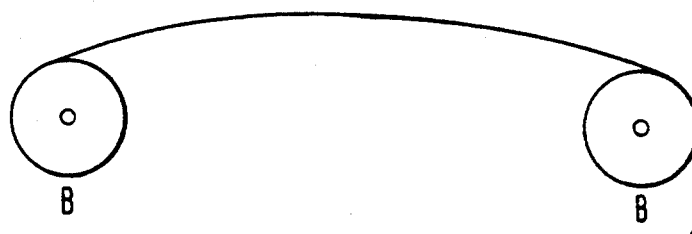
Figure 4C:
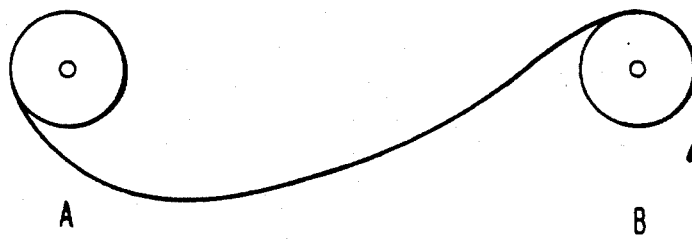
Figure 4D:
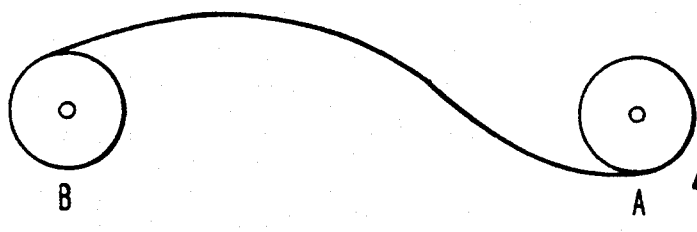

It will be appreciated that the apparatus illustrated in solid lines in FIG. 3 corresponds to the quiescent or inactive state of the dancer arms; and the broken lines indicate the active state thereof. FIG. 3 also illustrates an intermediate, or desired operating position, of the dancer arms.

A turntable 303, illustrated as a pie-shaped turntable, is rotatable about pivot axis 304 and, preferably, is disposed beneath strut 302 of dancer arm assembly 80. Spring 86 is fastened between strut 302 and turntable 303 to bias the strut in the counterclockwise direction (as viewed in FIG. 3). As will be described, the turntable is rotatably driven in the counterclockwise direction between its quiescent position shown in solid lines to its active position shown in broken lines. A pin or other upwardly projecting member 305 is mounted on turntable 303 and, by reason of the bias force exerted on strut 302 by spring 86, is engaged by and thus limits the movement of the strut. It will be recognized that as the turntable rotates in the counterclockwise direction, the strut likewise rotates in the counterclockwise direction in response to the spring bias force exerted thereon, and this movement is limited by pin 305. Of course, once the dancer arm assembly rotates to the active position shown in broken lines, there is no restraint to the clockwise rotation of strut 302, which is driven in response to the force exerted thereon by film 20 (not shown in FIG. 3).

Dancer arm assembly 90 is of similar construction, wherein a turntable 313 is provided with a pin 315 which is engaged by strut 312 that is biased thereagainst by spring 93 which is fastened between this strut and turntable 313. As the turntable rotates about pivot axis 314 in the clockwise direction, strut 312 likewise pivots in the clockwise direction; and once dancer arm assembly 90 rotates to its active position shown in broken lines, there is no restraint to the counterclockwise rotation of strut 312, which is driven in response to the force exerted by film 20 deployed about idler 94.

A rotary member 320, such as a rotary drive disk, is coupled to a motor 322 for bidirectional rotation. As schematically illustrated, rotary member 320 is secured at a radial position 324 to an end location 325 of turntable 303. Similarly, rotary member 320 is secured at a point 326 to an end location 327 of turntable 313. Preferably, a rigid rod, strut or link, represented as link 328, interconnects rotary drive member 320 with turntable 303 by being fastened to points 324 and 325, respectively, as shown. Similarly, a rod, strut or link, such as link 330, couples turntable 313 to drive member 320 by being mechanically fastened at points 326 and 327, as illustrated. Although links 328 and 330 preferably are rigid, it will be appreciated that an articulated arrangement of interconnecting members may be used.

In operation, when motor 322 is energized, rotary drive member 320 is driven in the direction of arrow E. Accordingly, point 324 rotates to the location shown at 324' and, as a result, link 328 is displaced to the position represented as 328' to angularly rotate turntable 303 from the position represented by solid lines to the position represented by broken lines. As the turntable rotates, spring 86 urges link 302 to pivot about pivot point 304 in the direction of arrow C, and idler 84 rides in slot 306 from its lower position to its upper position.

Likewise, the rotation of drive member 320 in the direction of arrow E rotates point 326 to position 326'. Hence, link 330 drives turntable 313 and spring 96 urges strut 312 to pivot about pivot point 314 in the direction of arrow D. Consequently, idler 94 rides upwardly in slot 316 from the position represented in solid lines to the position represented in broken lines. Thus, idlers 84 and 94 are driven vertically upward to their active positions, thereby creating the loops in film 12 illustrated in FIG. 2.

Springs 86 and 96 bias struts 302 and 312 in their upward direction; and this spring bias imparts tension to film 20 deployed about idlers 84 and 94. It will be appreciated that, as film tension increases, struts 302 and 312 tend to be driven in the downward direction. The actual position of the struts and, thus, an indication of the tension imparted on film 20, is produced by encoders 81 and 91 (FIG. 2). As mentioned above, if the supply reel rotates at a rate that is too slow relative to the rotary speed of sprocket wheel 72, this speed differential tends to reduce the size of the film loop deployed about roller 84, thus imparting a downward force on the idler which tends to pivot strut 302 in the clockwise direction (as viewed in FIG. 3). Encoder 81 senses this movement of strut 302.

Similarly, if the take-up reel rotates at a rate that is too fast relative to the forward rotary speed of the sprocket wheel, this speed differential tends to reduce the size of the film loop deployed about idler 94, thus imparting a downward force on the idler which tends to drive strut 312 in the counterclockwise direction (as viewed in FIG. 3). Encoder 91 senses the position of strut 312; and position indications are supplied to processor 98 to effect speed control, as discussed more particularly below in conjunction with the flow chart shown in FIG. 8.

FIG. 3 also illustrates a clamping plate 340 included in film gate 70 and adapted to move upwardly to clamp film 20 against a facing plate (not shown). A spring 342, anchored to the chassis of the cine-video system (or to another reference), urges plate 340 to move in the upward direction. A bracket 344 is secured to plate 340 and is adapted to be contacted by, for example, strut 312 so as to open the film gate when the dancer arm assemblies are in their quiescent positions. As the strut 312 pivots clockwise toward its active position, spring 342 urges plate 340 upwardly to close the film gate and maintain the film therein. It will be appreciated that other mechanical linkages may be provided between the dancer arm assemblies and the film gate.

Figure 5:
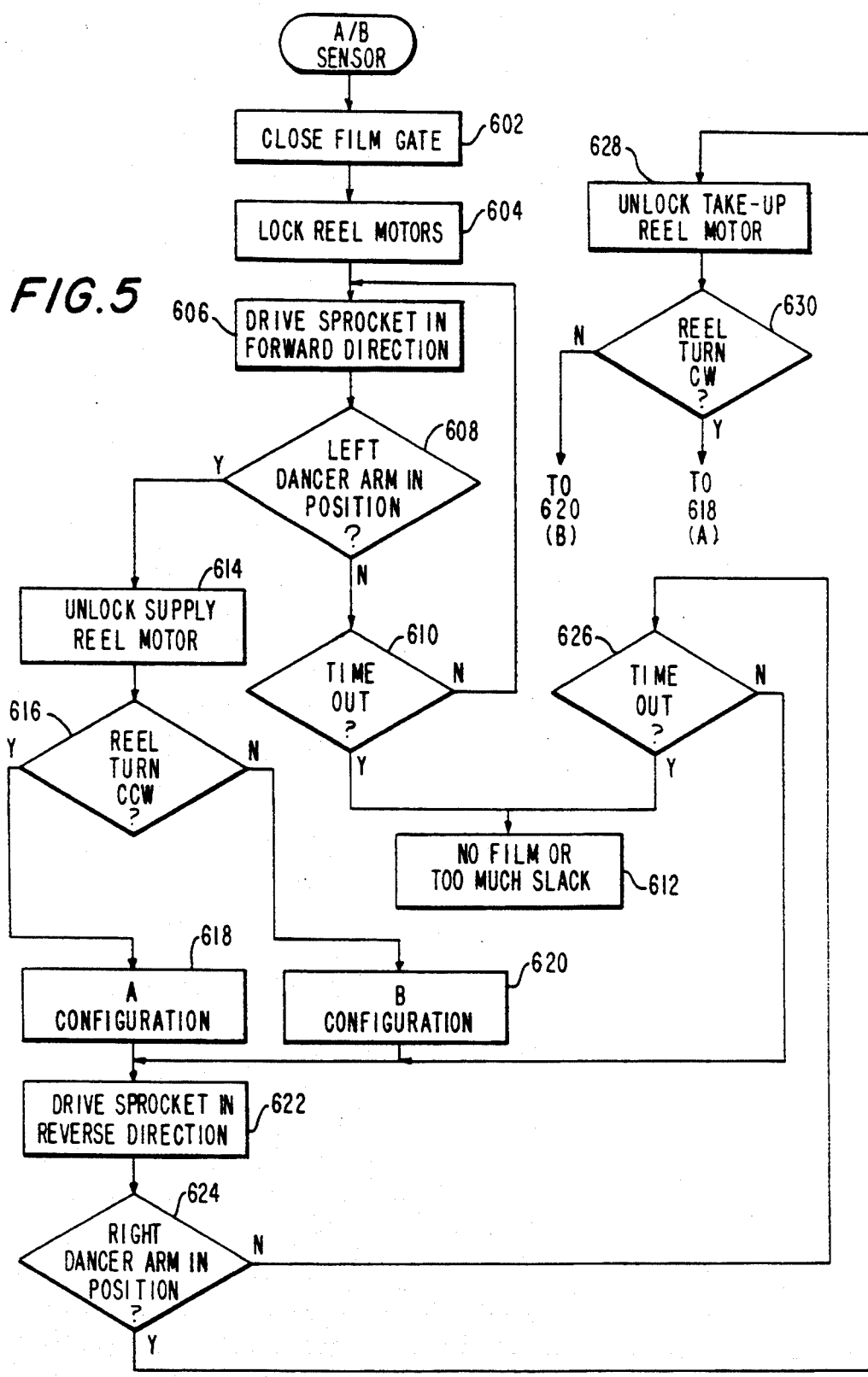
FIG. 5 is a flow chart representing the manner in which the A or B configuration of film wound on a reel is sensed.

Referring now to FIG. 5, there is illustrated a flow chart representing the routine carried out by processor 98 for identifying whether film is wound on the supply and take-up reels in A or B configuration. The routine illustrated in FIG. 5 is initiated in response to, for example, the actuation of film gate switch 24. Initially, the processor advances to instruction 602 which closes the film gate and, as mentioned above, serves to clamp film 20 at the imaging station of the film gate location for stable transport therethrough. The routine then advances to instruction 604 which energizes supply motor 76 and take-up motor 78 such that these reel motors are locked. Hence, supply reel 16 and take-up reel 18 likewise are locked to prevent film 20 from being paid out.

It will be appreciated that, when the film gate is closed, dancer arm drive assembly 60 (FIG. 2) operates to drive dancer arms 80 and 90 in the upward direction to impart tension on film 20, as mentioned above. It is expected that film 20 exhibits sufficient slack between the supply and take-up reels such that this movement of the dancer arms creates limited film loops, as shown in FIG. 2, and idlers 84 and 94 move upward to a position limited by this film slack. However, if film is not present when the film gate is closed or, alternatively, if the film exhibits excessive slack, there will be no substantial limitation on the upward movement of the idlers, and the expected positioning thereof will be surpassed. That is, in the absence of film in the film gate or in the presence of excess slack, idlers 84 and 94 will move upwardly to respective locations beyond their expected positions.

After the film gate is closed, dancer arms 80 and 90 are driven upwardly and supply and take-up motors 76 and 78 are locked, the routine shown in FIG. 5 advances to instruction 606 to energize sprocket motor 82 so as to drive sprocket wheel 72 in the forward direction which, during normal operation, transports film 20 from supply reel 16 to take-up reel 18. In the embodiment shown in FIG. 2, sprocket wheel 72 is driven in the counterclockwise direction. Such movement of film 20 while supply reel 16 is locked decreases the illustrated film loop and exerts a downward force on idler 84. Hence, if film is properly loaded, dancer arm 80 is moved in the downward direction; and it is expected that idler 84 reaches a predetermined, or reference, position which is sensed by encoder 81. However, if film is not loaded in the film gate or, alternatively, if the film exhibits excess slack, such counterclockwise (or forward) rotation of sprocket wheel 72 has either no or little effect on dancer arm 80. In any event, in the absence of film or in the presence of excess slack, idler 84 is not forced in the downward direction to its reference position.

As sprocket motor 82 is driven, the illustrated routine inquires, at 608, if dancer arm 80 has reached its reference position. If not, inquiry 610 determines if a predetermined time-out period has expired. If this latter inquiry is answered in the negative, the routine cycles through the loop formed of instruction 606 and inquiries 608 and 610.

As mentioned above, if film is not loaded in the film gate or if the film exhibits excess slack, it is expected that dancer arm 80 is not drawn down to its reference position and, therefore, the predetermined time-out period will expire. Thus, if this period times out before the dancer arm reaches its reference position, inquiry 610 is answered in the affirmative and the processor advances to instruction 612 to indicate that there is either no film loaded in the film gate or there is excess film slack. Although not shown in FIG. 5, in one embodiment, the routine then advances from instruction 612 to an unload instruction, whereby the film gate is opened and dancer arms 80 and 90 are driven by dancer arm drive assembly 60 to their respective quiescent positions.

Let it be assumed that dancer arm 80 reaches its reference position before the predetermined time-out period expires. Consequently, inquiry 608 is answered in the affirmative and the routine advances to instruction 614 to unlock supply motor 76. It is recalled that, at this time, sprocket wheel 72 is driven in the forward direction such that when the supply motor is unlocked, reel 16 rotates to pay out film 20.

Inquiry 616 determines if supply reel 16 rotates in the counterclockwise direction. If this inquiry is answered in the affirmative, the processor concludes that film is wound on the supply reel in A configuration, as represented by instruction 618. However, if inquiry 616 is answered in the negative, the processor concludes that film 20 is wound upon supply reel 16 in the B configuration. Thus, when the processor controls supply motor 76 to rotate supply reel 16 to pay out film 20 therefrom, motor 76 is driven in the proper direction compatible with this determined A or B configuration.

After establishing the configuration in which film is wound upon the supply reel, the routine advances to instruction 622 to control sprocket motor 18 to drive sprocket wheel 72 in the reverse direction. In the embodiment schematically shown in FIG. 2, motor 82 drives sprocket wheel 72 in the clockwise direction to effect reverse movement of film 20.

As the sprocket wheel is driven, inquiry 624 is made to determine if dancer arm 90 reaches its predetermined, or reference position. It is appreciated that, if film is loaded in the film gate and does not exhibit excessive slack, the clockwise rotation of sprocket wheel 72 while take-up reel 18 is locked decreases the film loop deployed about idler 94 to drive dancer arm 90 in the downward direction. Thus, it is expected that dancer arm 90 will reach its reference position before a predetermined time-out period expires. However, if film is not loaded in the film gate or, alternatively, if that portion of the film which extends between sprocket wheel 72 and take-up reel 18 exhibits excess slack, the predetermined time-out period will expire before dancer arm 90 reaches its reference position.

If inquiry 624 is answered in the negative, the routine advances to inquire, at 626, if the aforementioned time-out period has expired. If not, the routine cycles through the loop formed of instruction 622 and inquiries 624 and 626.

If the predetermined time-out period expires before dancer arm 90 reaches its reference position, inquiry 626 is answered in the affirmative and the routine advances to aforementioned instruction 612 to indicate that either film is not loaded in the film gate or the film exhibits excessive slack. In addition, the processor may control dancer arm drive assembly 60 and motors 76, 78 and 82 so as to open the film gate, return dancer arms 80 and 90 to their quiescent position and release reels 16 and 18.

Assuming, however, that film is loaded in the film gate and such film does not exhibit excessive slack, inquiry 624 is answered in the affirmative and the routine advances to instruction 628. Accordingly, take-up motor 78 is released, or unlocked, such that continued reverse rotation of sprocket wheel 72 pays out a portion of tape 20 from take-up reel 18. The direction of this rotation is represented by encoder 79 (FIG. 2) and processor 98 advances to inquiry 630 to determine if take-up reel 18 rotates in the clockwise direction. If this inquiry is answered in the affirmative, it is concluded that film 20 is wound thereon in A configuration and the routine advances to instruction 618, described above. Conversely, if reel 18 rotates in the counterclockwise direction, inquiry 630 is answered in the negative and the routine advances to aforedescribed instruction 620 to indicate that film is wound on the take-up reel in B configuration. Thereafter, although not shown in FIG. 6, the processor exits this routine.

Turning now to FIG. 6, there is illustrated a flow chart representing the routine carried out by the processor for sensing and controlling tension imparted by idlers 84 and 94 on film 20 at the entry and exit, respectively, of the film gate. In one embodiment, this routine is executed periodically, such as on the order of once every one millisecond, and the processor alternates between sensing tension imparted by idler 84 and tension imparted by idler 94. Initially, the routine commences with instruction 702 to sense the position of the supply dancer arm. It is recalled from FIG. 2 that a signal representing the position of dancer arm assembly 80 is produced by encoder 81, which may be implemented by an angle encoder to sense the angular position of strut 302 (FIG. 3). During normal operation, that is, during forward or reverse movement of film 20, it is desired that strut 302 exhibit the predetermined position shown in FIG. 3. In any event, the actual position of the strut and, thus, of the supply dancer arm, is sensed.

The routine then advances to inquiry 704 to determine if the supply dancer arm is at its predetermined position. If not, the offset from the predetermined position, that is, the difference between the actual and predetermined positions, is determined, as represented by instruction 706. For example, during forward film movement, if the supply dancer arm is at a position lower than its predetermined position, a negative offset value is determined by instruction 706. Conversely, if the position of the dancer arm is higher than its predetermined position, a positive offset is determined.

The offset determined by instruction 706 is used, in instruction 708, to increase or decrease the rotary speed of supply reel 16. More particularly, if a negative offset is determined in instruction 706, as will be the case if the tension imparted on film 20 by dancer arm assembly 80 increases, the speed at which supply reel 16 is driven is increased. It is recalled that this, in turn, reduces the tension imparted on the film and, as a consequence, the dancer arm returns to its predetermined position. However, if a positive offset is determined by instruction 706, thus representing that the tension imparted on the film by the supply dancer arm has decreased, the speed at which supply reel 16 is driven is reduced. This, in turn, tends to increase the tension imparted on the film and the supply dancer arm returns to its predetermined position.

During the next execution of the tension sensing routine of FIG. 6, the processor advances to instruction 710 to sense the position of take-up dancer arm assembly 90. Then, inquiry 712 is made to determine if the supply dancer arm is at its predetermined position. If not, the offset between the actual and predetermined positions of the supply dancer arm are determined at instruction 714, and this determined offset is used in instruction 716 to increase or decrease the speed at which take-up reel 18 is driven. More particularly, if a negative offset is determined by instruction 714, thus indicating that the position of the take-up dancer arm is lower than its predetermined position, the speed at which take-up reel 18 is driven is decreased. This reduces the tension imparted to film 20 by the take-up dancer arm; and the take-up dancer arm pivots toward its predetermined position. Conversely, if a positive offset is determined by instruction 714, thus representing that a decrease in tension is imparted to film 20 by take-up dancer arm assembly 90, the speed at which the take-up reel is driven is increased. This increases the tension imparted to the film and, as a result, the take-up dancer arm pivots toward its predetermined position.

Of course, if either inquiry 704 or inquiry 712 is answered in the affirmative, no change in the drive signal supplied to the supply and take-up reel motors is made.

The manner in which the approach of film 20 to its end is determined by the processor now will be described in conjunction with the flow chart shown in FIG. 7. This routine operates not only to detect when the end of the film wound upon supply reel 16 or take-up reel 18 is near, but also determines the speed at which sprocket motor 82, supply motor 76 and take-up motor 78 are driven. Although not shown in FIG. 7, it will be appreciated that this routine is executed periodically, such as on the order of once every millisecond. Initially, inquiry 802 determines if film 20 is being transported at a speed greater than 10 frames per second (fps). If not, it is assumed that the film speed is slow enough such that the user is able to observe when the film approaches its end. Hence, the processor exits the illustrated routine when inquiry 802 is answered in the negative.

Assuming that film is transported at a speed equal to or greater than 10 fps, the routine advances to inquire, at 804, if film 20 is being transported in the forward direction. If it is, the processor advances to inquiry 806 to determine if 10 film frames have been transported past the film gate. If inquiry 804 is answered in the negative, the routine advances to instruction 26 to perform a similar routine (as will be described) for determining when film 20 approaches its end wound upon take-up reel 18 as the film is being unwound therefrom.

Returning to inquiry 806, if this inquiry is answered in the negative, the processor exits the illustrated routine. Thus, until ten frames have been transported, the routine cycles through inquiries 802, 804 and 806 periodically.

Once ten (or any desired number) film frames have been transported through the film gate, inquiry 806 is answered in the affirmative and the processor advances to instruction 808 to determine the change, if any, in the position of dancer arm 80 since the dancer arm position last was sensed. It is recalled that encoder 81 is coupled to dancer arm 80 and functions to provide an indication of the position of this dancer arm. Accordingly, instruction 808 is carried out simply by comparing the latest encoded representation of dancer arm position with the previous encoded representation thereof. The change in dancer arm position $\Delta_{DA}$ is stored for use in calculating the diameter of supply reel 16.

Following instruction 808, the processor advances to instruction 810 to determine the change in the number of sprocket wheel encoder pulses that have been produced by encoder 77 since the last determination thereof was made. It will be appreciated that these encoder pulses represent the angular position of sprocket wheel 72. Assuming that instruction 810 (as well as instructions 808, 812 and 814) are executed once every ten film frames, instruction 810 determines the change in sprocket wheel encoder pulses $\Delta_{PS}$ while film 20 has been advanced by a distance equal to ten frames. Ideally, $\Delta_{PS}$ is substantially constant. This determined change in sprocket wheel encoder pulses $\Delta_{PS}$ is stored for subsequent use in calculating the diameter of the supply reel.

Following the execution of instruction 810, the processor advances to instruction 812 to determine the change in supply reel encoder pulses $\Delta_{PR}$ produced by encoder 77 since this determination last was made. As mentioned above, instruction 812 is carried out once every ten film frames and, thus, the number of supply reel encoder pulses that are generated by encoder 77 while ten frames have been transported is determined. This change in supply reel encoder pulses $\Delta_{PR}$ is stored for use in calculating the diameter of supply reel 16. As the supply reel diameter decreases, $\Delta_{PR}$ increases.

Once the change in dancer arm position $\Delta_{DA}$, the change in sprocket wheel encoder pulses $\Delta_{PS}$ and the change in supply reel encoder pulses $\Delta_{PR}$ have been determined and stored, the processor advances to instruction 814 which calculates the supply reel diameter in accordance with the following equation:

$$d_s = \frac{2\Delta_{DA} + \Delta_{PS}}{\Delta_{PR}}$$

It is seen that the diameter $d_s$ of supply reel 16 is determined as a function of the change in position of the dancer arm, the rotation of sprocket wheel 72 and the rotation of supply reel 16.

After the diameter of supply reel 16 has been calculated, the routine advances to inquiry 816 to determine if the calculated diameter $d_s$ differs from the previously calculated supply reel diameter $d'_s$ by more than 1. If inquiry 816 is answered in the negative, the routine advances to instruction 818 which supplies the calculated supply reel diameter $d_s$ as is for use in determining the average supply reel diameter $D_S$, to be described. However, if inquiry 816 is answered in the affirmative, that is, if the calculated supply reel diameter $d_s$ differs from the previous calculation thereof by more than unity, the routine advances to instruction 820 whereat the calculated supply reel diameter $d_s$ is limited such that $d_s = d'_2 + 1$ (where $d'_s$ is the previous calculation of the diameter of supply reel 16).

Following the calculation and, if appropriate, the limitation of the diameter $d_s$ of supply reel 16, the routine advances to instruction 822 to determine the average supply reel diameter. In the illustrated embodiment, this average is determined from the present and two preceding supply reel diameter calculations, wherein the previous calculation of the supply reel diameter is represented as $d'_s$ and the second preceding calculation of the supply reel diameter is represented as $d''_s$. It will be recognized that this averaging of the calculated supply reel diameters tends to filter out, or smooth, variations caused by abrupt dancer arm position changes, which are expected from time to time. Accordingly, the averaged supply reel diameter $D_S$ is determined as:

$$D_{Sj} = \frac{d_S + d_S' + d_S''}{3}.$$

Now, once the averaged supply reel diameter $D_s$ is obtained, the routine advances to instruction 824 to drive sprocket motor 82 and supply motor 76 at a speed equal to $15(D_s - D_{SH})$ fps, wherein $D_{SH}$ is the fixed diameter of the hub of the supply reel. From the description set out hereinabove, it is appreciated that this fixed hub diameter is equal to 2 inches or 3 inches, and the actual diameter is represented by user actuation of the keyboard shown in FIG. 1.

From the foregoing, it is recognized that, as the supply reel diameter decreases, that is, as $D_s \rightarrow D_{SH}$, the speed at which sprocket motor 82 and supply motor 76 are driven decreases. This speed is reduced to zero when the averaged supply reel diameter is substantially equal to the diameter of the supply reel hub. Thus, the film transport shown in FIG. 2 is stopped before film 20 flies off supply reel 16. In actual practice, it has been found that the film transport is stopped when approximately ten film frames remain wound upon the supply reel.

Figure 7:
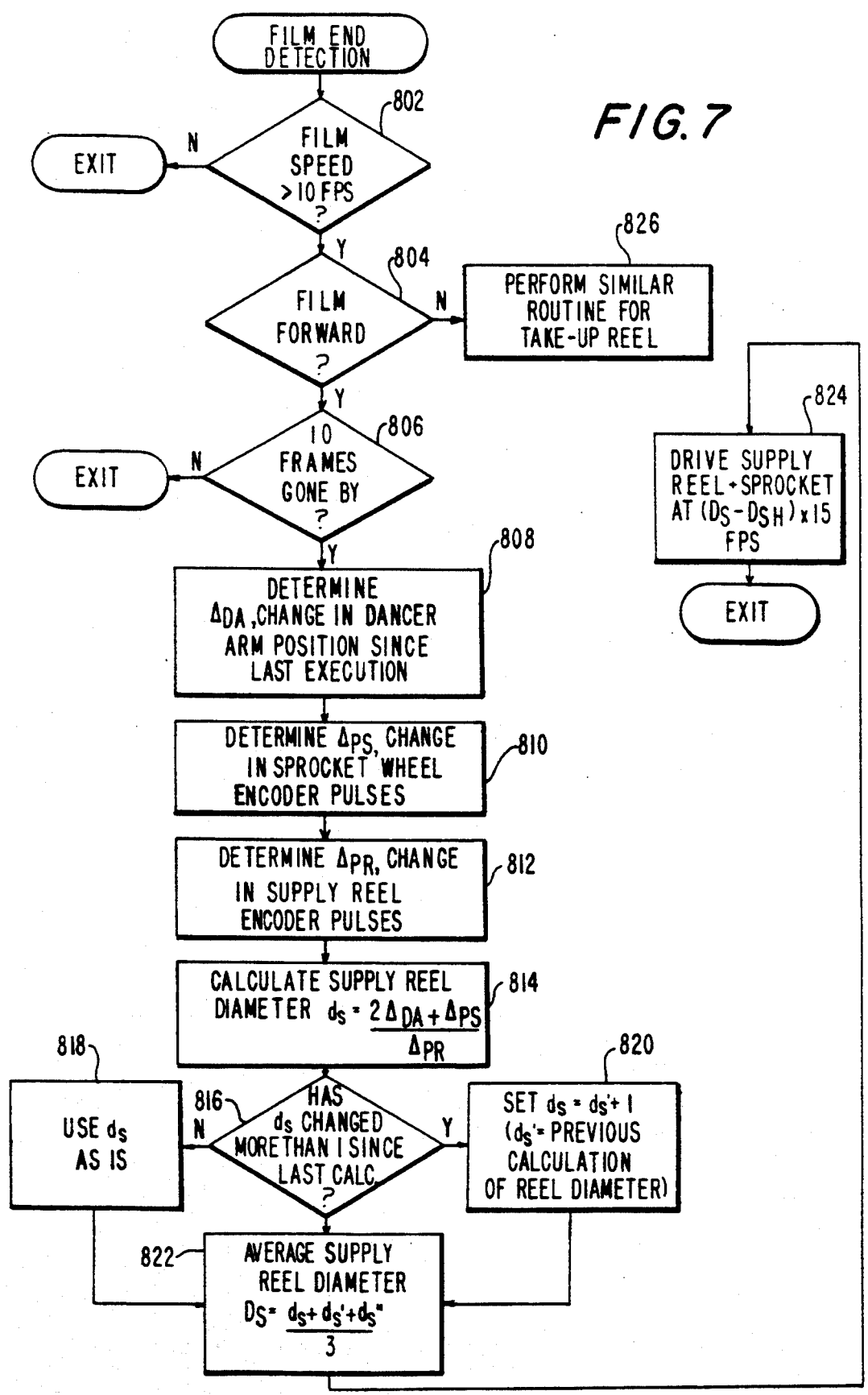
FIG. 7 is a flow chart representing the manner in which the present invention senses when the film approaches its end as it is unwound from a reel.

It is recognized that the routine illustrated in FIG. 7 is carried out not only to detect when film 20 approaches its end as it is unwound from supply reel 16 or from take-up reel 18, but this routine also is used to control the speed at which the film is transported between the reels. In practice, it has been found that the maximum transport speed is limited by the operating characteristics of the respective motors used to drive the sprocket wheel and the supply and take-up reels. If desired, instruction 824 may be modified so as to limit the maximum speed at which the supply and sprocket motors are driven so as not to exceed the rating of such motors.

The FIG. 7 flow chart has been described in detail in conjunction with the forward movement of film 20 from supply reel 16 to take-up reel 18. If film is transported in the reverse direction, a similar routine is carried out to calculate the average diameter of take-up reel 18 and to control the speed at which sprocket motor 82 and take-up motor 78 are driven. That is, if inquiry 804 is answered in the negative, this similar routine, represented by instruction 826, is executed.

As discussed above in conjunction with FIG. 1, the angular movement of speed control knob 50 determines the direction and speed at which film 20 is transported. The manner in which the processor produces drive signals to drive sprocket motor 18 in response to such angular rotation of the speed control knob now will be explained in conjunction with the flow chart shown in FIG. 8. Initially, the position of speed control knob 50 is sensed, as represented by instruction 902. It will be appreciated that the speed control knob may be coupled to a suitable angle encoder, such as a magnetic encoder, an optical encoder, or the like, adapted to produce signals corresponding to the angular position of knob 50. In one embodiment, a pulse is generated when the knob is rotated by a predetermined increment, and the direction in which the knob is rotated also is sensed, as by using quadrature pulse generators for the angle encoder. In the embodiment wherein a pulse is generated for each incremental angular position of the knob, these pulses are counted such that the count represents angular position. Alternatively, the encoder used with speed control knob 50 may be of the type which produces a digital signal whose value represents the angular position of the knob.

Once the position of the speed control knob is sensed, the routine advances to inquiry 904 to determine if the knob is at a zero, or reference, position. If not, a speed drive signal corresponding to the sensed position of the speed control knob is generated, as represented by instruction 906. In one embodiment, a look-up table may be provided wherein each incremental angular position of the speed control knob is associated with a discrete speed value; and this speed value is read out of the look-up table as the speed drive signal in response to the sensed position of knob 50. An incremental change in the position of the speed control knob results in a new speed drive signal read from the look-up table, and this table may be changed, or reprogrammed, as desired, such that a given angular displacement of knob 50 results in a different magnitude for the speed drive signal. This may be thought of as changing the speed selection settings of the processor.

In the preferred embodiment, if inquiry 904 is answered in the affirmative, those registers and/or counters which are used to store the sensed position of speed control knob 50 are reset, as represented by instruction 908. Hence, position errors which may accumulate as the knob is rotated to increase or decrease the film speed are reset once the knob returns to its zero position.

After the speed drive signal is generated at instruction 906, the processor inquires, at 910, if the speed control knob is at a detent position. In the preferred embodiment, a detent is emulated when knob 50 is rotated to predetermined, discrete positions. These positions may be indicated by suitable indicia, such as a mark, on the base plate of console 10, adjacent knob 50 (as shown in FIG. 1). Inquiry 910 merely determines if knob 50 has been rotated to one of these predetermined angular positions; and the position of each indicium may be changed, if desired, simply by changing the settings associated with these positions. If so, the routine advances to instruction 912 to activate a solenoid. In this embodiment, the solenoid is comprised of an electromagnet which, when activated, applies a restraining force to knob 50. It will be appreciated that this restraining force is easily overcome and, thus, serves merely to emulate a detent.

Then, once the solenoid is activated, the routine advances to inquiry 914 to determine if knob 50 has been rotated to a limit position. In the preferred embodiment, knob 50 is of the type which is freely rotatable, but for the activation of the solenoid, and there are no physical limitations or obstructions to this rotation. Hence, the knob may be rotated by n×360°. However, it is preferred that the user be prevented from rotating the knob in either the clockwise or counterclockwise direction by more than a predetermined angular amount. This predetermined angular amount is referred to as the limit position. Accordingly, if the sensed angular position of speed control knob 50 is equal to this limit position, inquiry 914 is answered in the affirmative and the processor advances to instruction 916 to inhibit further rotation of the knob in this direction. That is, the solenoid is supplied with sufficient current to prevent further rotation of the knob in the clockwise or counterclockwise direction, as the case may be. The user may, nevertheless, "back off" from this limit position; and this will, of course, result in a reduced speed driven signal.

After instruction 916 is executed, or if inquiry 910 or 914 is answered in the negative, the processor advances to instruction 918 to supply sprocket motor 82 (FIG. 2) with the speed drive signal generated by instruction 906. This routine then terminates.

Figure 8:
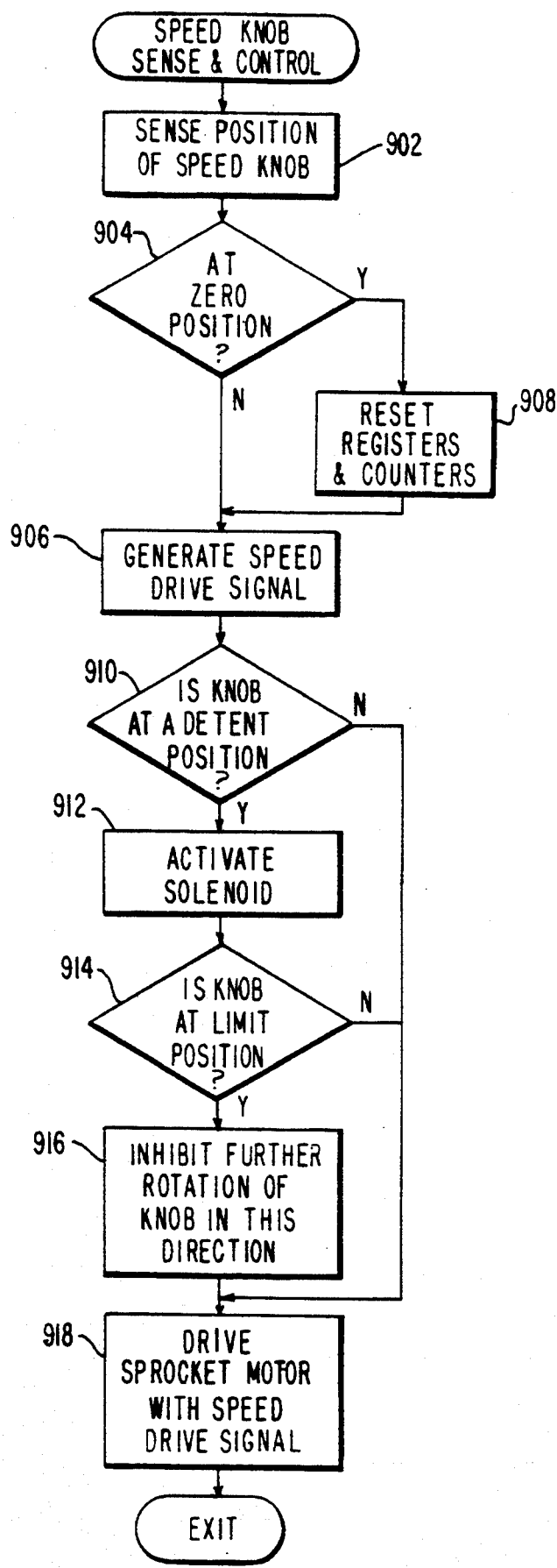
FIG. 8 is a flow chart which illustrates the manner in which speed selection is detected and speed control signals are generated.

Although not described above, it will be appreciated that the routine illustrated in FIG. 8 may be executed periodically, such as on the order of once every one millisecond, or in response to interrupts requested by the occurrence of other events. It is further appreciated that sprocket motor 82 is driven in the direction corresponding to the direction in which speed control knob 50 is rotated. For example, a clockwise rotation of the speed knob results in energizing motor 82 in a direction to drive film 20 in the forward direction. Conversely, counterclockwise rotation of speed control knob 50 results in a drive signal of polarity sufficient to driven sprocket motor 82 in a direction to reverse the film movement.

While the foregoing has particularly shown and described a preferred embodiment of the present invention, it will be appreciated by those of ordinary skill in the art that various changes and modifications may be made without departing from the spirit and scope of the invention. For example, film 20 may be transported by a capstan/pinch roller arrangement in place of sprocket wheel 72. Furthermore, the transport apparatus described herein need not be limited solely for use with film. Rather, other web-type media may be transported by this apparatus, such as tape. It is intended that the appended claims be interpreted as including the embodiment described herein, those alternatives and variations which have been mentioned hereinabove and all equivalents thereto.

What is claimed is:

1. In a cine-video system, film transport apparatus for transporting film from which video signals are produced during an imaging operation, comprising:
   supply and take-up reels having film wound thereon in A or B configuration and extending between said reels;
   motor-driven film drive means for transporting said film between said supply and take-up reels;
   tensioning means for initially imparting tension to said film disposed between said film drive means and one of said supply and take-up reels so as to effect an initial rotation of said one reel in response to said tension initially imparted to the film prior to said imaging operation; and
   sensing means coupled to said one reel to sense the direction of said initial rotation thereof and thereby identify whether said film is wound thereon in said A or said B configuration.

2. The apparatus of claim 1 further comprising reel drive means coupled to said one reel and selectively operable to drive said one reel in clockwise or counterclockwise direction for transporting film; and control means coupled to said reel drive means and responsive to said sensing means for controlling said reel drive means to drive said one reel in a direction compatible with the identified A or B configuration in which said film is wound on said one reel.

3. The apparatus of claim 2 wherein said one reel is said take-up reel and said tensioning means is disposed between said film drive means and said take-up reel; and further including tension detecting means for detecting the tension imparted to said film and supplying a corresponding tension signal to said control means for controlling said reel drive means to maintain a predetermined tension.

4. The apparatus of claim 3 wherein said control means controls said reel drive means to drive said take-up reel at a faster rate when said tension detecting means detects reduced tension and to drive said take-up reel at a slower rate when said tension detecting means detects increased tension.

5. The apparatus of claim 2 wherein said one reel is said supply reel and said tensioning means is disposed between said film drive means and said supply reel; and further including tension detecting means for detecting the tension imparted to said film and supplying a corresponding tension signal to said control means for controlling said reel drive means to maintain a predetermined tension.

6. The apparatus of claim 5 wherein said control means controls said reel drive means to drive said supply reel at a slower rate when said tension detecting means detects reduced tension and to drive said supply reel at a faster rate when said tension detecting means detects increased tension.

7. In a cine-video system film transport apparatus for transporting film from which video signals are produced during an imaging operation, comprising:
- supply and take-up reels having film wound thereon in A or B configuration and extending between said reels;
- motor-driven film drive means for transporting said film between said supply and take-up reels;
- tensioning means including a dancer arm for initially imparting tension to said film disposed between said film drive means and said take-up reel so as to effect an initial rotation of said take-up reel in response to said tension initially imparted to the film prior to said imaging operation;
- sensing means coupled to said take-up reel to sense the direction of said initial rotation thereof and thereby identify whether said film is wound thereon in said A or said B configuration;
- reel drive means coupled to said take-up reel and selectively operable to drive said take-up reel in clockwise or counterclockwise direction for transporting film;
- control means coupled to said reel drive means and responsive to said sensing means for controlling said reel drive means so as to drive said take-up reel in a direction compatible with the identified A or B configuration in which said film is wound on said take-up reel; and
- tension detecting means for detecting the tension imparted to said film and supplying a corresponding tension signal to said control means for controlling said reel drive means to maintain a predetermined tension by driving said take-up reel at a faster rate when said tension detecting means detects reduced tension and driving said take-up reel at a slower rate when said tension detecting means detects increased tension.

8. The apparatus of claim 7 wherein said dancer arm is bidirectionally movable; and said tension detecting means comprises means for detecting the position of said dancer arm to indicate tension imparted on said film.

9. In a cine-video system, film transport apparatus for transporting film from which video signals are produced during an imaging operation, comprising:
- supply and take-up reels having film wound thereon in A or B configuration and extending between said reels;
- motor-driven film drive means for transporting said film between said supply and take-up reels;
- tensioning means including a dancer arm for initially imparting tension to said film disposed between said film drive means and said supply reel so as to effect an initial rotation of said supply reel in response to said tension initially imparted to the film prior to said imaging operation;
- sensing means coupled to said supply reel to sense the direction of said initial rotation thereof and thereby identify whether said film is wound thereon in said A or said B configuration;
- reel drive means coupled to said supply reel and selectively operable to drive said supply reel in clockwise or counterclockwise direction for transporting film;
- control means coupled to said reel drive means and responsive to said sensing means for controlling said reel drive means so as to drive said supply reel in a direction compatible with the identified A or B configuration in which said film is wound on said supply reel; and
- tension detecting means for detecting the tension imparted to said film and supplying a corresponding tension signal to said control means for controlling said reel drive means to maintain a predetermined tension by driving said supply reel at a faster rate when said tension detecting means detects reduced tension and driving said supply reel at a slower rate when said tension detecting means detects increased tension.

10. The apparatus of claim 9 wherein said dancer arm is bidirectionally movable; and said tension detecting means comprises means for detecting the position of said dancer arm to indicate tension imparted on said film.

11. In a cine-video system, film transport apparatus for transporting film from which video signals are produced during an imaging operation, comprising:
- supply and take-up reels having film wound thereon in A or B configuration and extending between said reels;
- motor-driven film drive means for transporting said film between said supply and take-up reels;
- tensioning means including a dancer arm for initially imparting tension to said film disposed between said film drive means and one of said supply and take-up reels so as to effect an initial rotation of said one reel in response to said tension initially imparted to the film prior to said imaging Operation; and
- sensing means coupled to said one reel to sense the direction of said initial rotation thereof and thereby identify whether said film is wound thereon in said A or said B configuration.

* * * * *